United States Patent

Yates et al.

[11] Patent Number: 5,867,911
[45] Date of Patent: Feb. 9, 1999

[54] APPARATUS FOR ADJUSTING RELATIVE POSITIONS OF FIRST AND SECOND MEMBERS

[75] Inventors: Jan B. Yates, Reynoldsburg; John F. Searle, Hudson; Gregory A. Trees, Columbus, all of Ohio

[73] Assignee: McCulloch Corporation, Tucson, Ariz.

[21] Appl. No.: 898,966

[22] Filed: Jul. 23, 1997

[51] Int. Cl.⁶ .................................................. F16C 11/10
[52] U.S. Cl. ........................ 30/276; 30/296.1; 16/326; 16/329; 403/97; 403/102
[58] Field of Search .................................. 30/276, 296.1, 30/298; 16/110 R, 111 R, 326, 328, 329; 403/93, 97, 101, 102, 103; 294/58, 59

[56] References Cited

U.S. PATENT DOCUMENTS

| | | | |
|---|---|---|---|
| D. 251,699 | 5/1979 | Averitt | D8/8 |
| D. 253,086 | 10/1979 | Hinklin et al. | D8/8 |
| D. 372,649 | 8/1996 | Tuggle et al. | D8/8 |
| 702,097 | 6/1902 | Haviland | 294/58 |
| 1,586,056 | 5/1926 | Walsh . | |
| 2,531,227 | 11/1950 | Lubins | 294/58 |
| 3,086,596 | 4/1963 | Allegrett et al. | 172/15 |
| 3,572,870 | 3/1971 | Marks et al. | 312/244 |
| 4,134,204 | 1/1979 | Perdue | 30/276 |
| 4,148,141 | 4/1979 | Hoff | 30/276 |
| 4,152,832 | 5/1979 | Akaike et al. | 30/276 |
| 4,156,312 | 5/1979 | Ballas, Sr. | 30/276 |
| 4,179,805 | 12/1979 | Yamada | 30/122 |
| 4,188,719 | 2/1980 | Hoff | 30/122 |
| 4,207,675 | 6/1980 | Causey et al. | 30/296.1 |
| 4,285,128 | 8/1981 | Schnell et al. | 30/276 |
| 4,603,478 | 8/1986 | Anderson | 30/276 |
| 4,785,540 | 11/1988 | Arvidsson | 30/520 |
| 4,825,548 | 5/1989 | Driggers | 30/276 |
| 4,929,113 | 5/1990 | Sheu | 403/157 |
| 4,930,181 | 6/1990 | Johnson | 16/110 R |
| 5,039,118 | 8/1991 | Huang | 280/47.371 |
| 5,056,805 | 10/1991 | Wang | 403/93 |
| 5,065,476 | 11/1991 | Dohse et al. | 16/114 R |
| 5,123,768 | 6/1992 | Franklin | 403/96 |
| 5,168,601 | 12/1992 | Liu | 403/93 |
| 5,181,369 | 1/1993 | Everts | 56/12.7 |
| 5,197,817 | 3/1993 | Wood et al. | 403/97 |
| 5,265,341 | 11/1993 | Kikuchi | 30/276 |
| 5,265,969 | 11/1993 | Chuang | 403/94 |
| 5,431,468 | 7/1995 | Rosenshine | 294/58 |
| 5,474,350 | 12/1995 | Gauthier | 294/58 |
| 5,520,474 | 5/1996 | Liu | 403/97 |
| 5,542,151 | 8/1996 | Stranski et al. | 16/326 |
| 5,544,417 | 8/1996 | Atos et al. | 30/276 |
| 5,586,363 | 12/1996 | Fanuzzi | 16/342 |

*Primary Examiner*—Hwei-Siu Payer
*Attorney, Agent, or Firm*—Marshall, O'Toole, Gerstein, Murray & Borun

[57] ABSTRACT

Apparatus for adjusting a first member relative to a second member comprises a button with two sets of teeth and movable between first and second positions. When in the first position, both sets of teeth engage sets of teeth carried by the first and second members to prevent relative movement of the first and second members. When in the second position, one of the sets of teeth carried by the button disengages one of the sets of teeth carried by one of the first and second members to allow relative movement thereof.

12 Claims, 4 Drawing Sheets

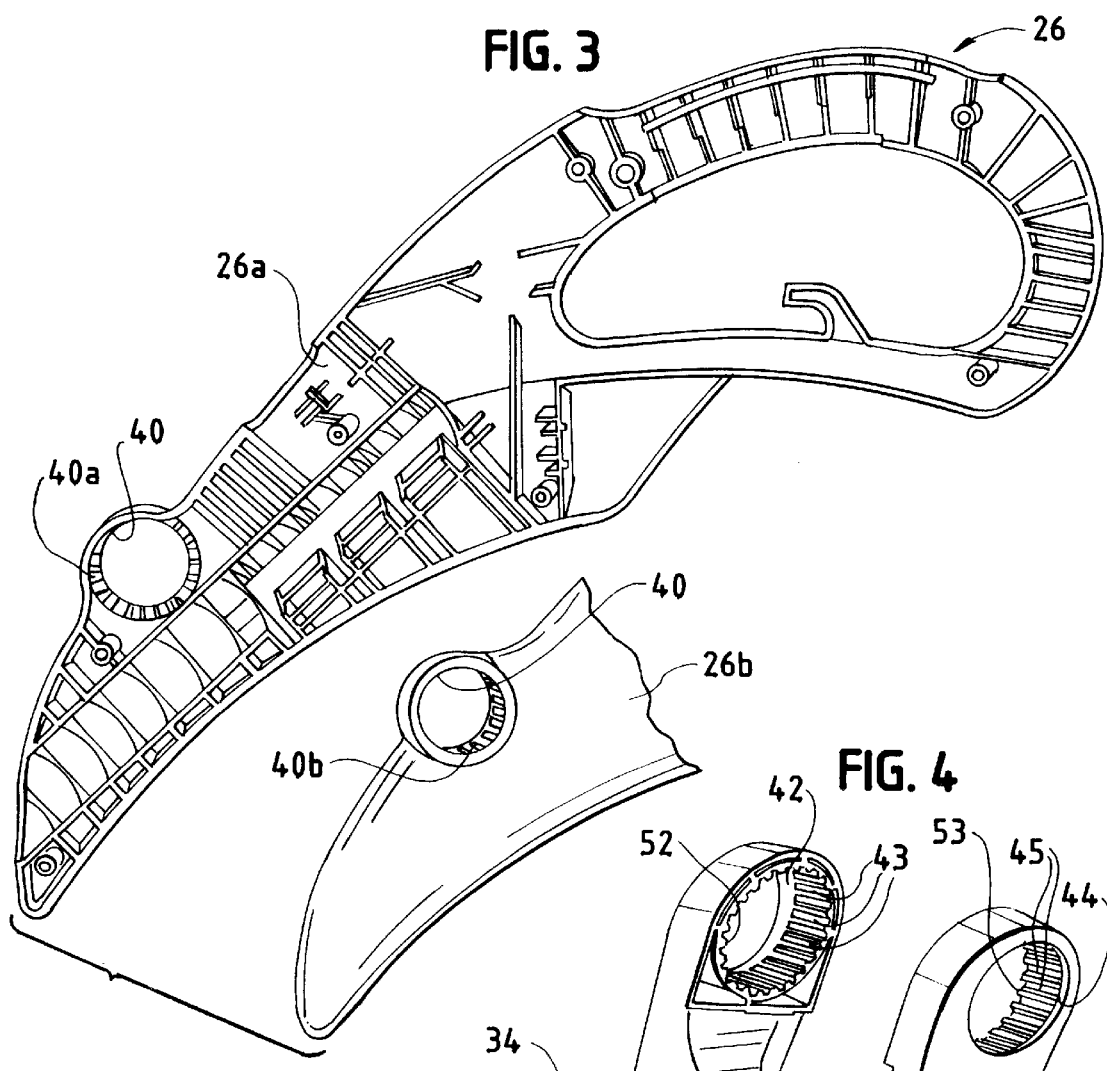
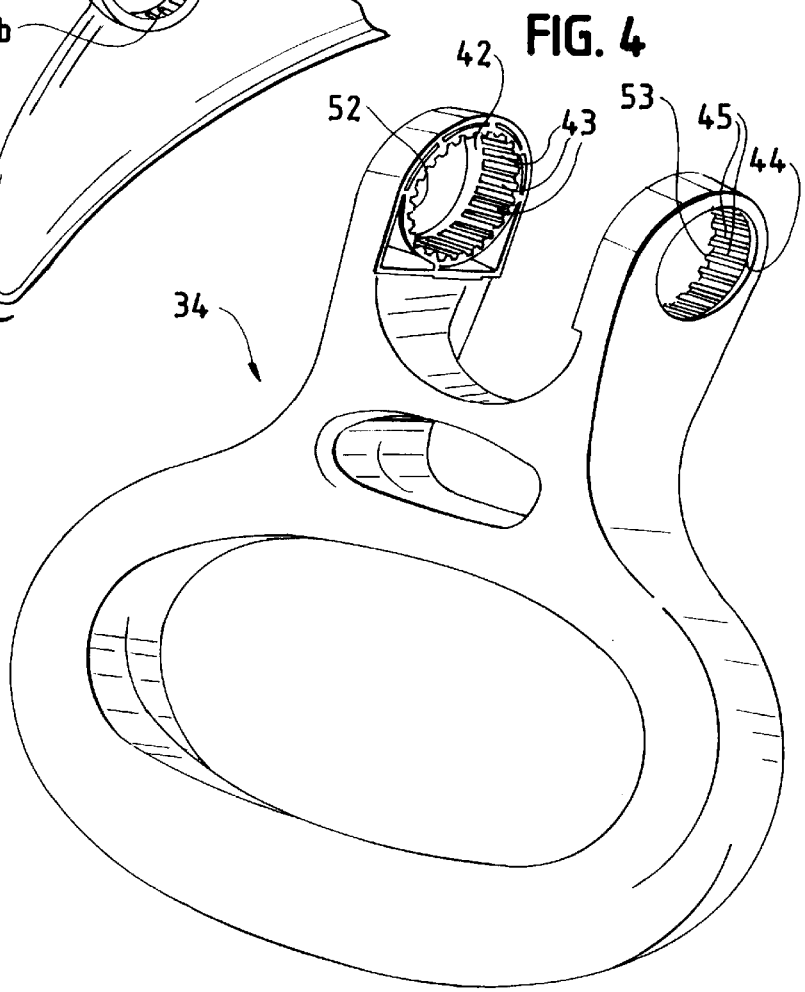

5,867,911

APPARATUS FOR ADJUSTING RELATIVE POSITIONS OF FIRST AND SECOND MEMBERS

TECHNICAL FIELD

The present invention relates generally to adjustable members and, more particularly, apparatus for adjusting relative positions of first and second members.

BACKGROUND ART

Portable rotary cutting tools, such as string trimmers, long have been used to cut vegetation, particularly in areas inaccessible by a lawn mower or other cutting device. Such portable rotary cutting tools include a small internal combustion engine or electric motor operatively connected to a distal cutting element. Such tools typically are provided with a fixed rear support handle and a forward control handle secured to the shaft. The forward handle, in conjunction with the rear handle, serves the purpose of supporting the tool with both hands and provides for better guiding control of the rotary cutting element. Typically, the forward handle attached to the shaft is fixed in position, however, others have devised forward string trimmer handles that are adjustable with respect to the shaft, such as disclosed in the Driggers U.S. Pat. No. 4,825,548.

SUMMARY OF THE INVENTION

An auxiliary forward handle that is manually adjustable about a pivot axis permits the position of the auxiliary handle to be adjusted through an arc of about 180° and a lock/release mechanism operatively connected to the auxiliary handle permits the handle to be locked in position at any of several predetermined points over the arc. The adjustable handle is useful for any device that is gripped by an operator, particularly hand tools, such as a string trimmer, shovel, rake, lawn edger, brush cutter, hedge trimmer, snow thrower, shaft mounted blower, and the like. The auxiliary handle is particularly effective when included together with a fixed handle so that an operator can grasp the device firmly and controllably with both hands, and position one hand at a desired position, in relation to the position of the other hand, to maximize the effectiveness, balance, and aim of the device, and to minimize fatigue of the operator.

In accordance with one aspect of the present invention, an apparatus for adjusting a first member relative to a second member includes: a button having two sets of axially-spaced teeth; a set of teeth carried by the first member; and a set of teeth carried by the second member; wherein the button is movable between a first position at which the sets of teeth of the button engage the sets of teeth of the first and second members to prevent relative movement of the first and second members and a second position at which at least one of the sets of teeth of the button is disengaged from the teeth of both of the first and second members to allow relative movement of the first and second members.

In accordance with another aspect of the present invention, apparatus for adjusting a first member relative to a second member includes first and second axially-spaced buttons wherein the first button has first and second sets of axially-spaced teeth and the second button has third and fourth sets of axially-spaced teeth. Fifth and sixth sets of teeth are carried by the first member and seventh and eighth sets of teeth are carried by the second member. The buttons are movable between a first position at which the first and second sets of teeth engage the fifth and seventh sets of teeth, respectively, and the third and fourth sets of teeth engage the sixth and eighth sets of teeth, respectively, to prevent relative movement of the first and second members and a second position at which the first set of teeth are disengaged from the fifth set of teeth and the third set of teeth are disengaged from the sixth set of teeth to allow relative movement of the first and second members.

BRIEF DESCRIPTION OF THE DRAWINGS

FIG. 3 is a fragmentary, exploded perspective view of the portions of the main handle showing the bore and teeth therein;

FIG. 4 is a perspective view of the auxiliary handle with spaced bores and teeth;

DESCRIPTION OF THE PREFERRED EMBODIMENT

Figure 1:
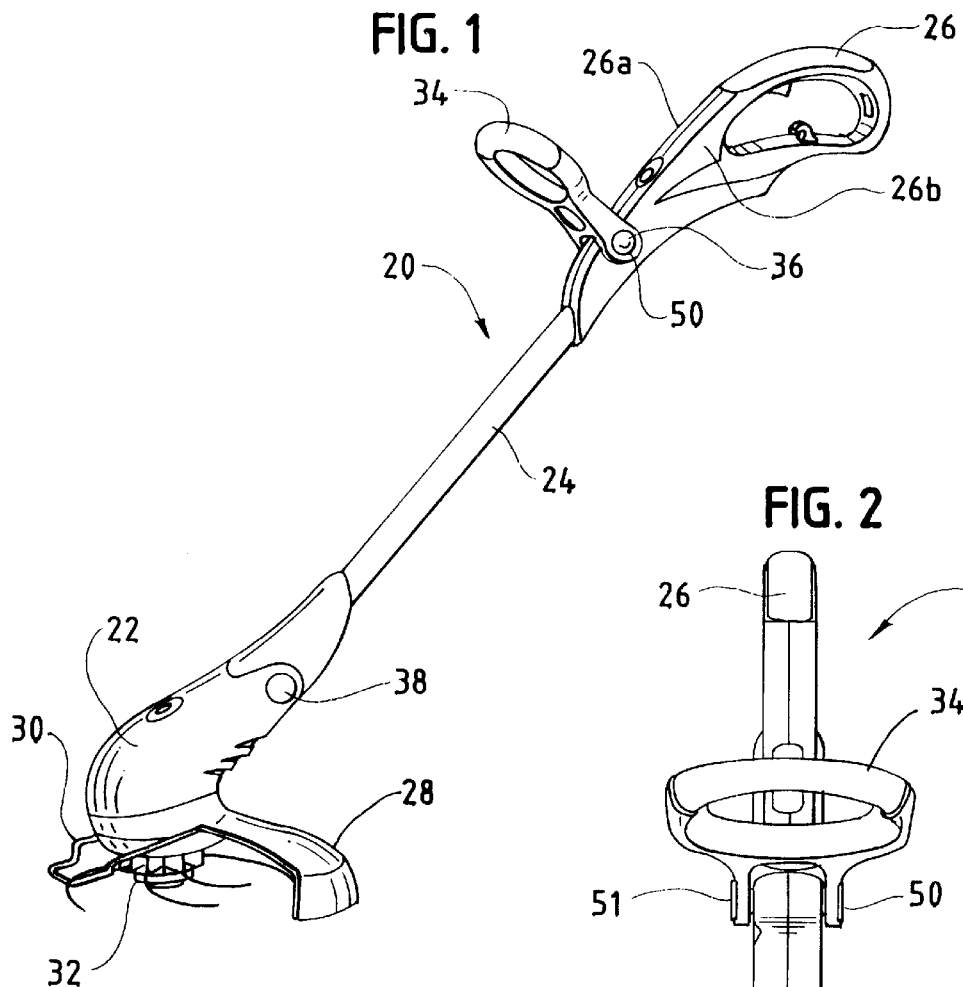
FIG. 1 is a perspective view of a string trimmer incorporating the present invention.
Figure 2:
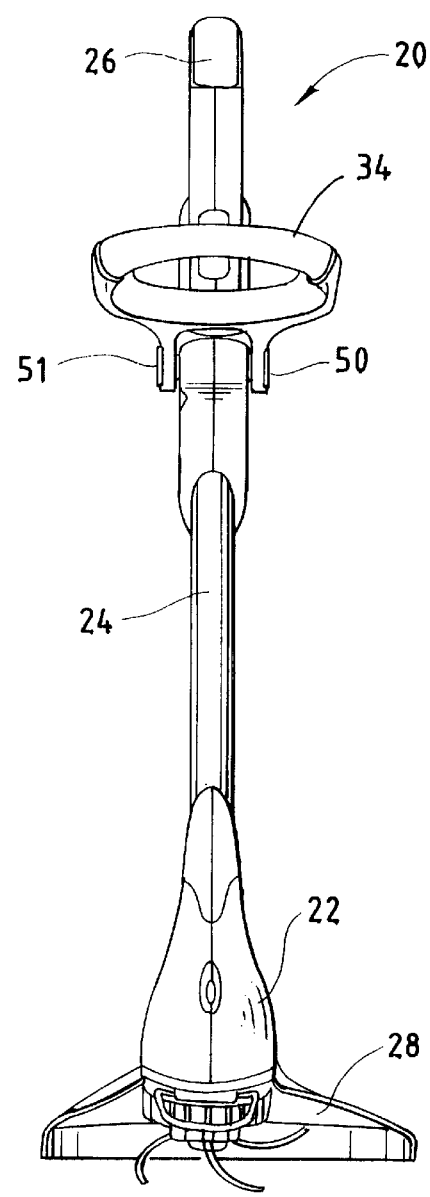
FIG. 2 is a front elevational view of the string trimmer of FIG. 1.

Referring first to FIG. 1, a string trimmer 20 includes a motor housing 22 disposed at a lower end of a boom 24 and a fixed main handle 26 located at an upper end of the boom 24. A shield 28 is secured to the housing 22 and a wire guard 30 is secured to one or both of the housing 22 and the shield 28. The wire guard 30 prevents an operator from moving a head assembly 32 closer than a certain distance to an object. The wire guard 30 may also be operable in a trimmer mode to serve as a guide. A motor (not shown) is disposed within the housing 22 and is connected to electrical conductors extending from the handle assembly 26 through the boom 24 and into the housing 22. The electrical conductors may be connected to a source of power to energize the motor, as is conventional.

In accordance with the present invention, the string trimmer 20 includes an adjustable, auxiliary handle 34 pivotally connected to a lower portion of the main handle 26 and pivots about a fixed pivot axis 36 as described in more detail hereinafter. In a preferred embodiment, the angle between upper and lower portions of the housing 22 also can be adjusted manually, about a lower pivot axis 38, in the same manner and using the same structure, as the pivoting of the adjustable handle 34.

Figure 5:
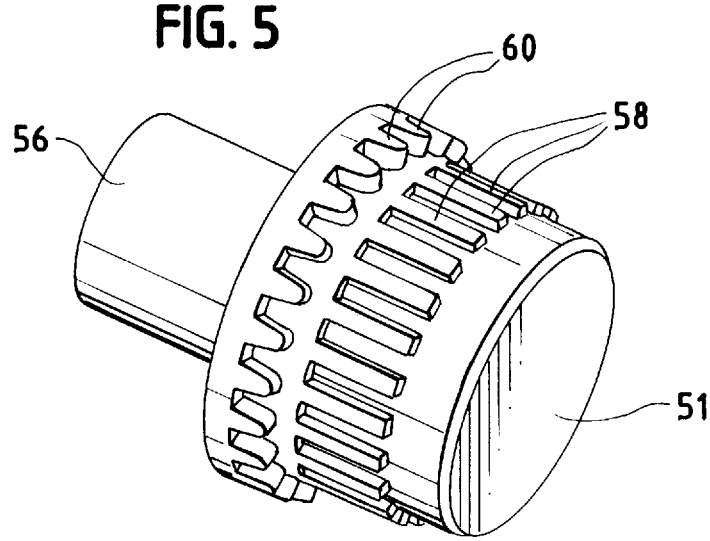
FIG. 5 is a perspective view of one of the buttons used in the lock/release mechanism.
Figure 6:
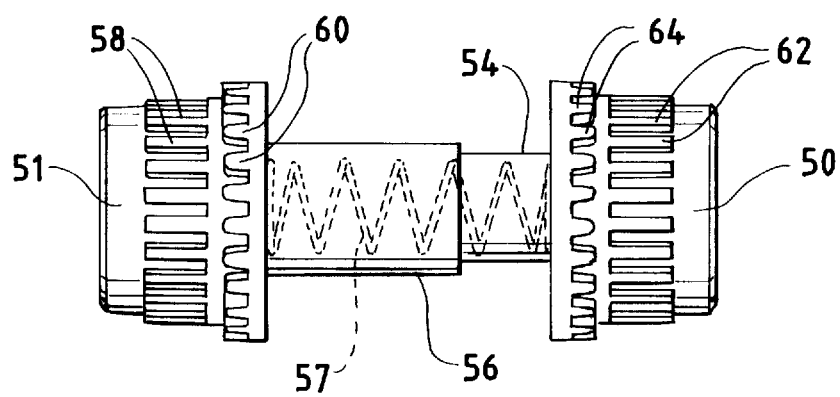
FIG. 6 is an elevational view of two opposed buttons with hollow stems which are axially aligned.
Figure 7:
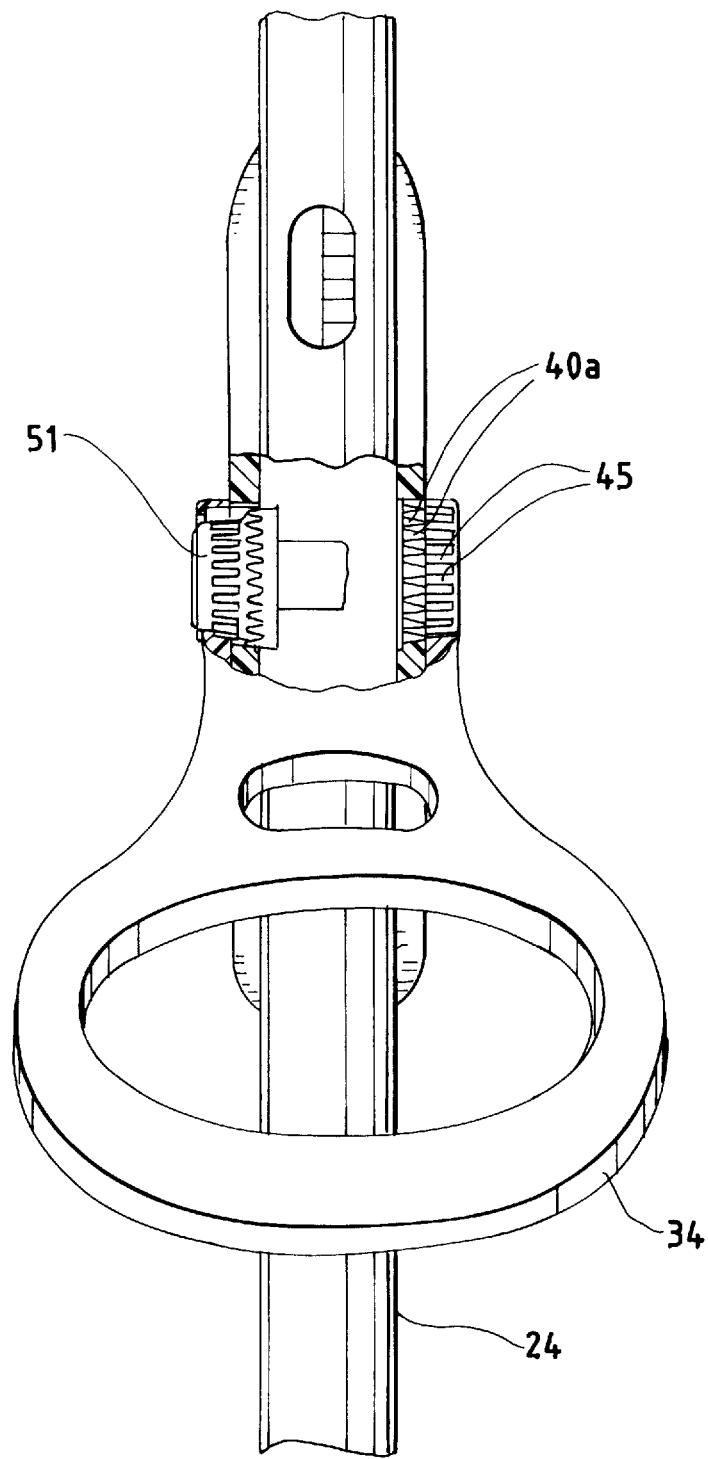
FIG. 7 is a fragmentary, elevational view, with portions in section and broken away, showing one of the buttons disposed in bores in the auxiliary and main handles.

Referring now to FIGS. 3–7, the operation of the adjustable handle 34 and its interconnection to a lower portion of the fixed handle 26 are shown in detail. As shown in FIGS. 3 and 7, the fixed main handle 26 is formed from two mating halves, 26a, 26b, which are substantially mirror images of one another. Aligned apertures define a transverse bore 40 extending completely through both main handle halves and includes annularly spaced teeth 40a in main handle half 26a and annularly spaced teeth 40b in mating main handle half 26b. The auxiliary, adjustable handle 34 includes two aligned bores 42 and 44 each carrying annularly spaced tapered teeth 43 and 45, respectively, disposed in axial alignment with the bore 40 in main handle 26. Main handle bore 40 is disposed between the spaced auxiliary handle bores 42 and 44.

The mechanical interconnection, release and locking mechanism that secures the auxiliary handle 34 to the main handle 26 is shown in detail in FIGS. 6 and 7. As shown in FIGS. 6 and 7, the adjustable auxiliary handle 34 is interconnected to a lower portion of the main, fixed handle 26 by a pair of opposed buttons 50 and 51, spring biased outwardly through inner openings 52 and 53, respectively, of bores 42 and 44 in the auxiliary handle 34. Button 50 has an integral stem 54 and button 51 has an integral axially aligned stem 56 of slightly larger diameter than stem 54 so that stem 54 telescopes into stem 56. An internal spring 57 is disposed internally within both stems 54 and 56 to bias both buttons outwardly, as best shown in FIG. 6.

The button 51 carries an axially outer set of relatively smaller diameter annularly spaced teeth 58 adjacent to and spaced from an axially inner set of larger diameter annularly spaced tapered teeth 60. The button 50 includes sets of teeth 62, 64 preferably identical to the sets of teeth 58, 60. The larger diameter inner teeth 60 and 64 are disposed between the main handle halves 26a and 26b and mate within the teeth 40a and 40b in the interior of the main handle 26 when the buttons 50 and 51 are in the outward lock position. When buttons 50 and 51 are compressed inwardly to telescope smaller shaft 54 farther into larger hollow shaft 56, the outer sets of teeth 58 and 62 remain engaged with the relatively wide, mating teeth 43 and 45 within auxiliary handle bores 42 and 44, respectively, but the inner sets of teeth 60 and 64 are disengaged from the relatively narrower teeth 40a and 40b within the main handle bore 40 to release the auxiliary handle 34 from the main handle 26, allowing rotation of the auxiliary handle 34 about the pivot axis. When the auxiliary handle 34 is positioned at a desired angle with respect to the main handle 26, the buttons 50 and 51 are released to reengage the inner sets of teeth 60 and 64 with the mating teeth 40a, 40b carried by bore 40 in the main handle 26 to lock the auxiliary handle 34 into position.

As seen in FIGS. 5–7, each of the teeth 60, 64 and the mating teeth 40a, 40b in the main handle are tapered so that full engagement between the teeth occurs to substantially eliminate play between the auxiliary handle 34 and the main handle 26.

As described, buttons 50 and 51 carry two outer sets of teeth 62 and 58, respectively, for continued engagement with mating teeth 45 and 43, respectively, in the bores 44 and 42 of the adjustable handle. Buttons 50 and 51 also carry two inner sets of teeth 64 and 60 for lock/release engagement with teeth 40a and 40b in the main handle halves 26a and 26b, respectively. Similarly, identical structure at pivot axis 38 (FIG. 1) provides two continued teeth engagements with upper or lower portions of motor housing 22 and two lock/release engagements with lower or upper portions of housing 22 for adjusting the angle of the lower portion of the motor housing 22 with respect to the boom 24 and fixed handle 26. Thus, the lie of the string trimmer also can be adjusted to adapt the string trimmer to a particular user.

If desired, the teeth 58 and 62 and the teeth 43 and 45 may be configured such that the teeth 58, 62 become disengaged from the teeth 43, 45 during the time that teeth 60, 64 are disengaged from the teeth 40a, 40b.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

What is claimed is:

1. Apparatus for adjusting a first member relative to a second member, comprising:

first and second axially-spaced buttons wherein the first button has first and second sets of axially-spaced teeth and the second button has third and fourth sets of axially-spaced teeth; fifth and sixth sets of teeth carried by the first member and seventh and eighth sets of teeth carried by the second member;

wherein the buttons are movable between a first position at which the first and second sets of teeth engage the fifth and seventh sets of teeth, respectively, and the third and fourth sets of teeth engage the sixth and eighth sets of teeth, respectively, to prevent relative movement of the first and second members and a second position at which the first set of teeth are disengaged from the fifth set of teeth and the third set of teeth are disengaged from the sixth set of teeth to allow relative movement of the first and second members.

2. The apparatus of claim 1, further including a spring disposed between and biasing apart the first and second buttons.

3. The apparatus of claim 2, wherein the first button includes a stem portion telescoped within the second button.

4. The apparatus of claim 1, wherein the first and second members comprise a main handle and an auxiliary handle, respectively, of a vegetation cutter.

5. The apparatus of claim 1, wherein the first and second members comprise upper and lower motor housing portions, respectively, of a vegetation cutter.

6. The apparatus of claim 1, wherein the teeth of the first set and the teeth of the fifth set are complementarily-shaped and tapered, and wherein the teeth of the third set and the teeth of the sixth set are complementarily-shaped and tapered.

7. Apparatus for adjusting a first member relative to a second member, comprising:

a button having two sets of axially-spaced teeth;

a set of teeth carried by the first member; and a set of teeth carried by the second member;

wherein the button is movable between a first position at which the sets of teeth of the button engage the sets of teeth of the first and second members to prevent relative movement of the first and second members and a second position at which at least one of the sets of teeth of the button is disengaged from the teeth of both of the first and second members to allow relative movement of the first and second members.

8. The apparatus of claim 7, including a further button spaced from and movable toward the first-named button.

9. The apparatus of claim 8, wherein the further button includes two sets of teeth engageable with further sets of teeth carried by the first and second members, respectively.

10. The apparatus of claim 8, further including a spring disposed between the first-named and further buttons.

11. The apparatus of claim 7, wherein the first and second members comprise a main handle and an auxiliary handle, respectively, of a vegetation cutter.

12. The apparatus of claim 7, wherein the first and second members comprise upper and lower motor housing portions, respectively, of a vegetation cutter.

* * * * *